March 5, 1929.  E. J. WENDELL  1,704,642
ROTARY PUMP OR BLOWER
Filed Nov. 30, 1926

Inventor,-
Evert J. Wendell,
by his Attorneys,
Howson & Howson

Patented Mar. 5, 1929.

1,704,642

UNITED STATES PATENT OFFICE.

EVERT J. WENDELL, OF WAYNE, PENNSYLVANIA.

ROTARY PUMP OR BLOWER.

Application filed November 30, 1926. Serial No. 151,771.

This invention relates to rotary pumps of the type including geared or intermeshing rotors, and relates more particularly to improvements in the methods of driving such pumps.

The principal object of the invention is to provide an improved drive or transmission particularly well suited for use in connection with high speed electric motors, and to this end the invention contemplates the provision of a compact drive or transmission affording a desirable relatively great speed reduction between the motor and the pump.

A further object of the invention is to provide a drive for pumps of the stated type in which the normal wear of the parts will not affect the timing or set relation between the intermeshing rotors.

A still further object of the invention is to provide means whereby the timing of the rotors may be effected through the drive or transmission mechanism by simple adjustment of one or more of the parts, whereby the necessity for close machining and mounting of the shafts and rotors in the pump and of the transmission elements is obviated.

Figure 1:
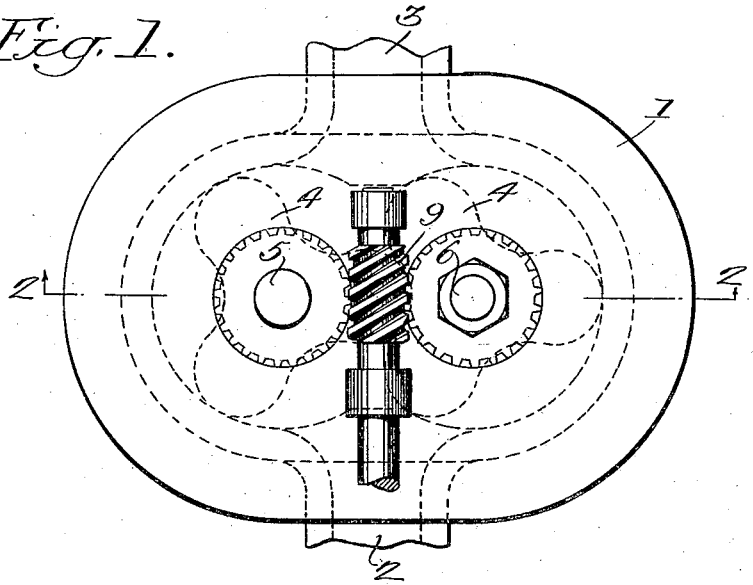
Figure 2:
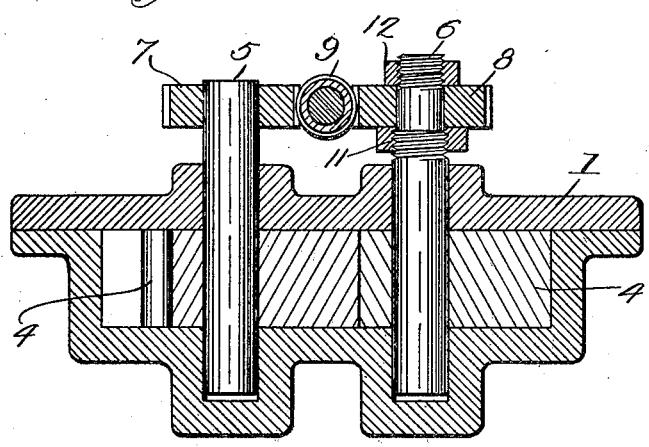

These and other useful ends hereinafter appearing I have accomplished by means of the mechanism illustrated in the attached drawings, in which:

Figure 1 is a plan view of a pump made in accordance with the present invention, and Fig. 2 is a section on the line 2—2, Fig. 1.

Referring to the drawings, and particularly to Figs. 1 and 2 thereof, it will be noted that the pump in the embodiment illustrated comprises a casing 1 having an intake opening 2 and a discharge opening 3, and having mounted in the interior thereof intermeshing rotors 4, 4. These rotors are mounted, respectively, on shafts 5 and 6, which extend through one side of the casing, as shown in Fig. 2, and have mounted on their projecting ends spiral gears 7 and 8 which mesh with a multiple-thread worm 9 journaled directly between the gears, as clearly shown. In the present instance, the shaft 6 is threaded on its outer end for the reception of lock nuts 11 and 12 which occupy positions one on either side of the gear 8 and provide means for adjusting the gear axially of the shaft to thereby vary the position of the gear with respect to the relatively fixed worm 9.

It will be noted that by reason of the character of the intermeshing rotors 4, 4, there is a definite relation between the rotors, the spiral gears 7 and 8, and the worm 9 requiring an accurate relative setting of these parts. Normally this involves a careful mounting of the gears on the shafts and careful adjustment of the worm 9, and entails accurate machining of the parts. It will be apparent, however, that with the gears relatively fixed circumferentially of the shafts and meshing with the worm, movement longitudinally of the shaft of one of said gears must result in a rotative adjustment of the corresponding shaft and a consequent relative adjustment of the rotors. The relative positioning and adjustment of the rotors and of the associated parts may therefore be accomplished by the axial adjustment of the gear 8, made possible by use of the nuts 11 and 12 for retaining the gear axially of the shaft.

Entirely aside from the adjustment feature described above with its many obvious advantages, the drive or transmission mechanism including the gears 7 and 8 and the intermediate worm 9 meshing with both gears affords material and peculiar advantages in connection with rotors of the type described. It has been customary to gear the intermeshing rotors of the pumps together by means of spur gears and to drive both rotors through one of these gears or through a second gear on one of the rotor shafts. It is frequently desirable to operate small sized pumps from electric motors, which later operate at a much higher rate of speed than the maximum efficient rotor speed of the pump. Where the pumps therefore are coupled direct to the motors, through spur gear drive, the pump speed is necessarily excessive. Speed reduction with spur gears is impractical by reason of the excessive space which such reduction gearing occupies. The worm and spiral gear transmission described above provides a wide range of speed ratios between the motor and the pump with a minimum of bulk in the drive or transmission mechanism.

A further important advantage of the drive resides in the fact that wear developing in the transmission mechanism between the worm and the gears is equally distributed between the parts and does not affect the rotor setting. Regardless of wear developing in the transmission therefore, the timed relation between the rotors remains constant, whereas in the ordinary spur gear transmission, the slightest wear developing in the transmission gearing directly affects the rotor setting. In the foregoing respects therefore, the drive affords material and practical advantages over the customary spur gear transmission in pumps of this type, and affords also the great manufacturing advantage of making possible the proper setting or timing of the rotors and of the driving parts by means of a simple adjustment of one of the gears axially of its shaft.

I am aware that this type of transmission is not in itself novel, and no attempt is herein made to claim this per se. What I do believe is novel is the combination of the herein-described transmission with a pump of the stated type with the attendant unexpected advantages of sustained efficiency and durability, due to a constantly maintained relative setting of the cooperating rotors, and of the increased simplicity of manufacture and assembly due to the novel method of relatively adjusting the parts.

I claim:

In a rotary pump, the combination with a pair of intermeshing rotors, of shafts supporting the said rotors, a gear carried by each of said shafts, a worm mounted between and meshing with both of said gears, at least one of said gears being spiral in character, and means providing for adjustment of said spiral gear longitudinally of its shaft.

EVERT J. WENDELL.